(12) United States Patent
Slezak et al.

(10) Patent No.: US 7,787,769 B1
(45) Date of Patent: Aug. 31, 2010

(54) ROUTING CYCLES FOR WAVELENGTH SWITCHED OPTICAL NETWORKS

(75) Inventors: James Craig Slezak, Ottawa (CA); Douglas Clayton Rider, Ottawa (CA); Anthony Vernon Walker Smith, Ottawa (CA)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1792 days.

(21) Appl. No.: 10/061,623

(22) Filed: Feb. 1, 2002

Related U.S. Application Data

(63) Continuation-in-part of application No. 09/909,265, filed on Jul. 19, 2001.

(51) Int. Cl.
 *H04J 14/00* (2006.01)
(52) U.S. Cl. .................................................. 398/57
(58) Field of Classification Search .................. 398/3, 398/7, 25–27
 See application file for complete search history.

(56) References Cited

U.S. PATENT DOCUMENTS

| | | | |
|---|---|---|---|
| 2002/0063915 A1* | 5/2002 | Levandovsky et al. | 359/110 |
| 2002/0071392 A1 | 6/2002 | Grover et al. | 370/241 |
| 2003/0011844 A1* | 1/2003 | Park et al. | 359/128 |

FOREIGN PATENT DOCUMENTS

WO 01/18999 A1 3/2001

OTHER PUBLICATIONS

E. Bouillet et al., "Wavelength Usage Efficiency versus Recovery Time in Path-Protection DWDM Mesh Networks", OFC 2001, Mar. 19, 2001.*
"Graph Theory with Applications to Engineering and Computer Science", Prentice-Hall, 1974, pp. 57-58, 144-146 and 274-290.*
"An Introduction to Data Structures with Applications", 2nd Edition, by Tremblay et al., McGraw-Hill, 1984, pp. 569-570.*
C. Baworntummarat et al., "On the Comparison of Optical WDM Mesh Network Protection Strategies", IEEE, 2000.*

(Continued)

*Primary Examiner*—Shi K Li
(74) *Attorney, Agent, or Firm*—Capitol Patent & Trademark Law Firm, PLC

(57) ABSTRACT

The routing cycles method establishes a connection between a source network node and a destination network node based on a cycles graph. For each connection request, the network identifies 'k' valid solution cycles on the cycles graph, taking into account any constraints imposed by the type of routing requested. Each valid solution cycle is then split into a pair of routes, which are validated against explicit constraints received with the request, if any. The performance of each pair is then estimated and the pairs are ordered in a list based on their performance. The pair ordering is carried out based on the cost of the routes and on the chance of a successful set-up, which is given by an estimated Q factor. The network attempts to set up the connection according to the class of service for the respective request, first along the best route(s) from the list. Failing this, it will try the second best route(s), etc.

18 Claims, 10 Drawing Sheets

OTHER PUBLICATIONS

"Graph Theory with Applications to Engineering and Computer Science" by Narsingh Deo, Prentice-Hall, 1974, pp. 1-11,14-35, 39-64.*
U. Dogrusöz et al., "Cycle Vector Space Algorithms for Enumerating all Cycles of a Planar Graph", Technical Report 95-5, Rensselaer Polytechnic Institute, Jan. 1995.*
"Graphs, Networks, and Algorithms" by M. Swamy et al., John Wiley & Sons, 1981, pp. 72-92.*
"Cycle-Oriented Distributed Preconfiguration: Ring -Like Speed with Mesh-Like Capaity for Self-Planning Network Restoration" Grover, IEEE, 0-7803-4788, 1998, pp. 537-543.
G. Lehr et al, "Management o All-Optical WDM Networks: First Results of European Research Project MOON", NOMS '98. IEEE Network Operations and Management Symposium, vol. 3 Conf. 10, Feb. 15, 1998, pp. 870-879, XP000793435.
Nada Golmie et al, "A Differentiated Optical Services Model for WDM Networks", IEEE Communications Magazine, vol. 38, No. 2, Feb. 2000, pp. 68-73, XP000912316.
Nasir Ghani et al, "On IP-over-WDM Integration", IEEE Communications Magazine, vol. 38, No. 3, Mar. 2000, pp. 72-84, XP011091247.
Wolfgang Mader et al, "Results of the PHOTON and MOON Field Trials", OFC/IOOC '99. Optical Fiber Communication Conference/ International Conference on Integrated Optics and Optical Fiber Communication, Feb. 21, 1999, pp. 234-236, XP000967039.

* cited by examiner

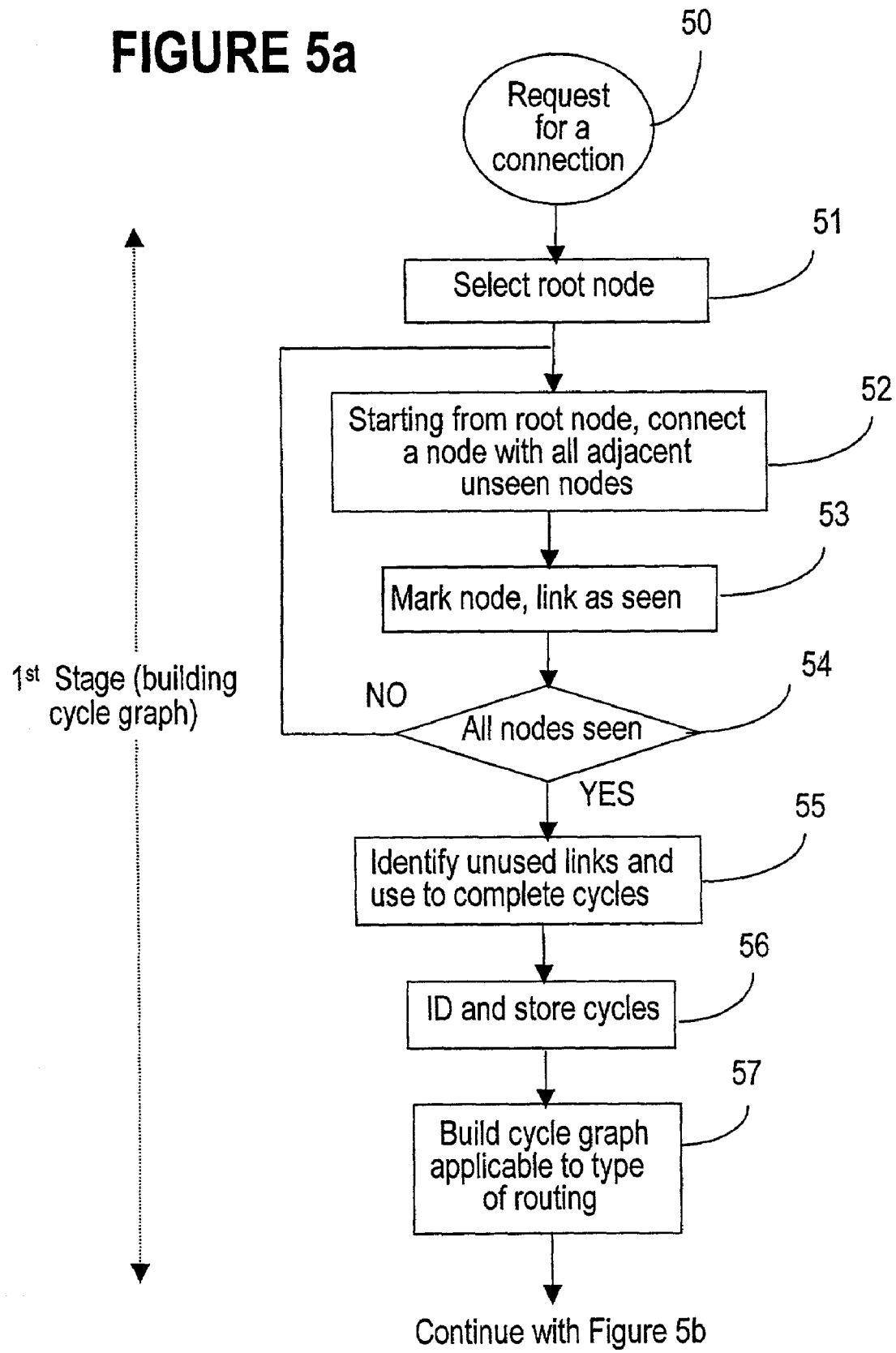

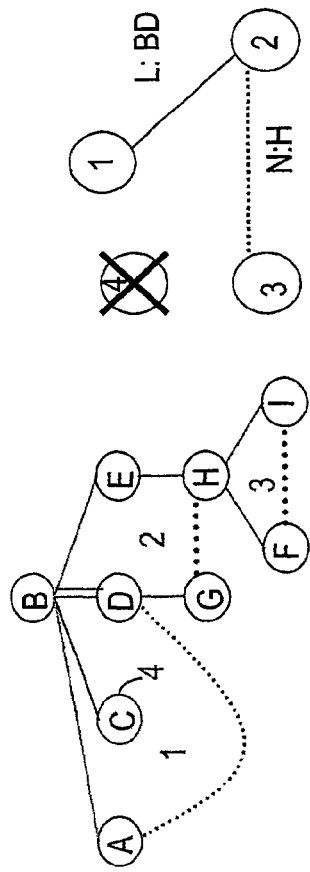
FIGURE 9d
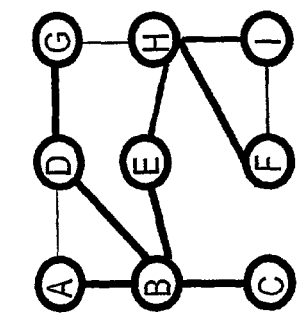
FIGURE 9c
FIGURE 9b
FIGURE 9a
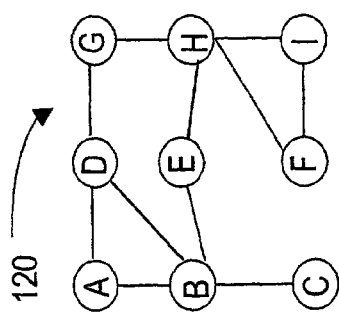
FIGURE 9e
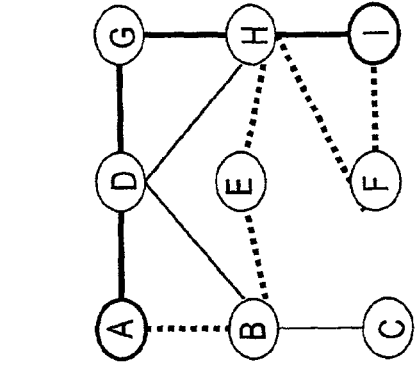
FIGURE 10b
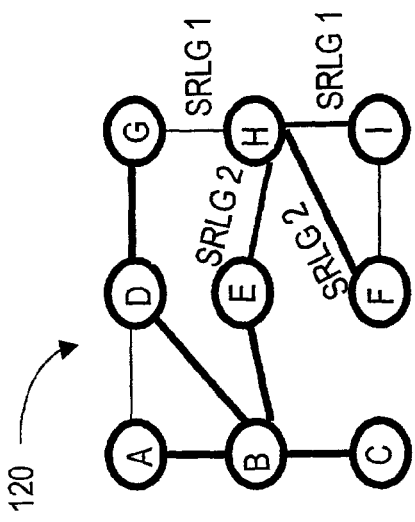
FIGURE 10a
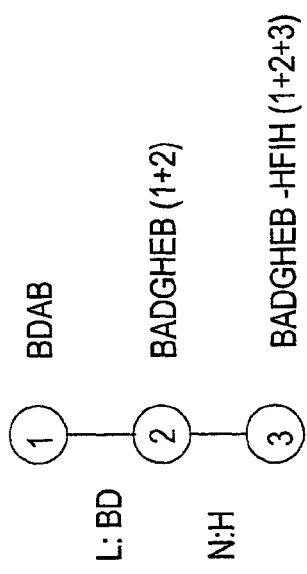

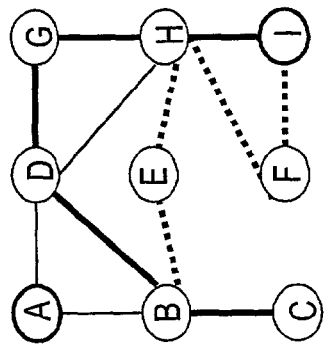
FIGURE 11a
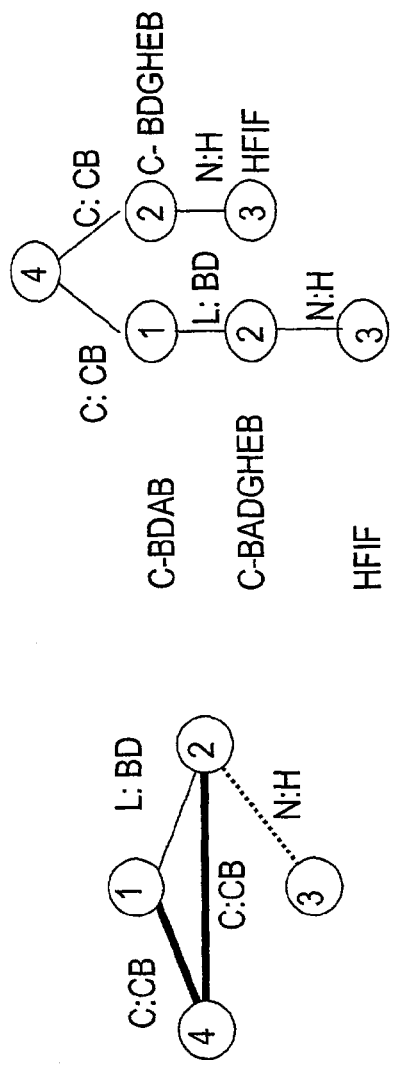
FIGURE 11b
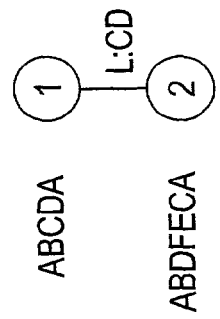
FIGURE 11c
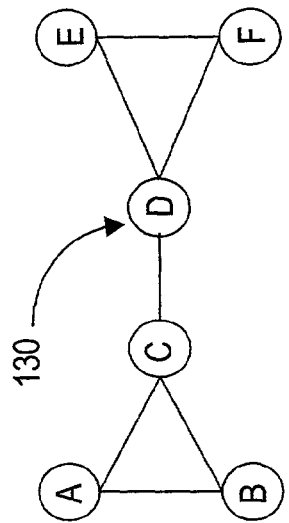
FIGURE 12a
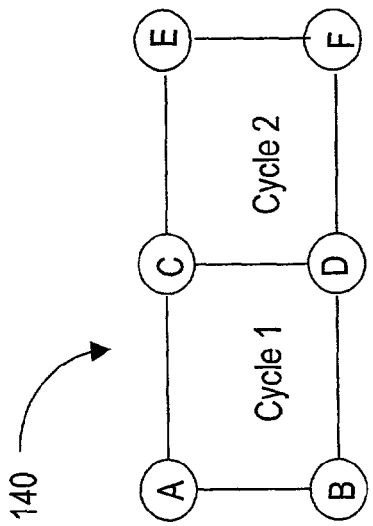
FIGURE 12b
ABCDA
ABDFECA
FIGURE 12c

BDEFB

BDFGIHFEB

ROUTING CYCLES FOR WAVELENGTH SWITCHED OPTICAL NETWORKS

PRIORITY PATENT APPLICATION

This application is a continuation in part of the co-pending U.S. patent application Ser. No. 09/909,265, entitled "Wavelength Routing and Switching Mechanism for a Photonic Transport Network", Smith et al., filed Jul. 19, 2001, assigned to Innovance Networks.

RELATED US PATENT APPLICATIONS

U.S. Patent Application "Architecture For A Photonic Transport Network", (Roorda et al.), Ser. No. 09/876,391, filed Jun. 7, 2001, assigned to Innovance Networks.

U.S. Patent Application "Wavelength Exerciser", (Solheim et al.), Ser. No. 10/021,709, filed Dec. 12, 2001) assigned to Innovance Networks.

FIELD OF THE INVENTION

The invention is directed to a telecommunication network, and in particular to a routing method for wavelength switched optical networks.

BACKGROUND OF THE INVENTION

Expansion of optical transport networks is obtained today by increasing the network capacity and/or reach. A higher network capacity is achieved by increasing the channel rate, known as TDM (time division multiplexing) and/or increasing the density of channels in the respective transmission window, known as WDM (wavelength division multiplexing).

Advances in transmitter and receiver design, evolution of optical amplification, employment of distributed Raman amplification combined with various dispersion compensation techniques, advanced encoding and modulation techniques, digital wrapper technology, etc., enabled installation of ultra-long reach, dense WDM (DWDM) networks, where regeneration of the signal is effected at 3,000 km or more.

The next step in evolution of communications is the agile network, where the point-to-point linear/ring architecture characterized by fixed channel allocation is replaced by an agile architecture characterized by a flexible end-to-end channel allocation.

There is a need to provide a routing method, which allows automatic and flexible establishment of end-to-end routes across an agile optical network on request, so that wavelengths become resources deployable across the network. Such method should be able to provision the routes in an efficient manner to allow revenue collection based on the class of service of each individual connection.

SUMMARY OF THE INVENTION

It is an object of this invention to provide a routing method for automatically establishing connections between any two switching nodes of an agile network, according to the current network topology and loading.

It is another object of the invention to provide an agile network with a routing method, which allows establishment of end-to-end routes based on network rules, and on conditions imposed by the respective connection request.

Accordingly, the invention provides a method of establishing a connection between a source network node and a destination network node of an automatically switched network comprising: (a) selecting a root network node and building a cycles graph using the root network node; (b) identifying on the cycles graph 'k' valid solution cycles for a respective connection request; (c) preparing from the 'k' valid solution cycles a list of valid routes for the connection, including at least a first and a second route; and (d) setting up the connection according to a class of service CoS specified by the connection request, based on the list, wherein k is a specified integer.

The invention is also directed to a method of establishing a connection between a source network node and a destination network node of an automatically switched optical network, comprising: detecting a set of fundamental cycles for the network and building a cycles graph; identifying on the cycles graph 'k' valid solution cycles for the connection request, wherein k is a specified integer; preparing from the 'k' valid solution cycles a list of valid routes for the connection, including at least a first and a second route; and setting up the connection according to a class of service CoS specified by the connection request, based on the list.

The invention is further directed to a method of establishing a connection between a source network node and a destination network node of an automatically switched optical network, comprising: constructing a cycles graph for the network and preparing a list of 'k' valid route pairs for the connection based on the cycles graph, and setting up the connection according to a class of service CoS specified by a respective connection request, based on the list.

According to another aspect of the invention, an automatically switched optical network, is provided with a routing module for preparing a list of valid routes for a connection request, including at least a first and a second route, the routing module comprising: a cycle management unit for providing one or more solution cycles; and a cycles validating unit for validating a solution cycle that conforms with a type of routing specified in the connection request.

Advantageously, the routing method according to the invention offers flexibility of connection provisioning and allows automatic channel selection and setup across the network infrastructure. The route selection is based on real time link availability and photonic link budgets, while balancing the network loading and utilizing regenerative elements where/when necessary. As well, route selection is based on flexible routing rules, and on conditions imposed by the connection request.

As well, the cycles method is extremely flexible and can perform classes of service (CoS) such as for example 0:1 CoS, 0:2 with node diverse, node diverse best effort (BE), link diverse, link diverse BE shared risk link group (SRLG) diverse and SRLG diverse BE types of routing, or 0:1 reserved dial RR with node diverse best effort type of routing. It also allows for node inclusions and exclusions and explicit constraint. Provisioning connections according to a class of service allows the network provider to collect revenues differentiated according to the service provided.

By combining sets of fundamental cycles to create new cycles and then testing these new cycles to see that they meet the constraints on the requested path, in a process referred to as validation, cycles can be found quickly. As the routing cycles method operates with cycles, (pairs of routes) the protection/restoration function is naturally dealt with. In addition, the fact that the route construction is based on cycles rather than nodes means that the problem space is vastly reduced, and therefore searches to find optimal answers become more feasible in medium and large networks than in the corresponding node version of the same network.

The "Summary of the Invention" does not necessarily disclose all the inventive features. The inventions may reside in a sub-combination of the disclosed features.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 5a and 5b show a flowchart of the routing cycles method, according to an embodiment of the invention. The flowchart of FIG. 5a continues on FIG. 5b.

FIG. 8 illustrates the cycles tree for the network of FIG. 6a;

FIGS. 9a to 9e illustrate the construction of a cycles tree for identifying a pair of routes for a request with a link diversity constraint;

FIGS. 10a and 10b illustrate how a pair of trails is identified for a request with a SRLG diversity constraint;

FIGS. 11a to 11c illustrate how a pair of trails is identified for a node diversity best effort request;

FIGS. 12a to 12c illustrate an example of applicability of the routing cycles method for a 0:1 class of service for a network with a cut edge;

Similar references are used in different figures to denote similar components.

DESCRIPTION OF THE PREFERRED EMBODIMENTS

The following description is of a preferred embodiment by way of example only and without limitation to combination of features necessary for carrying the invention into effect.

Architecture of a Wavelength Switched Network (Agile Network)

Figure 1:
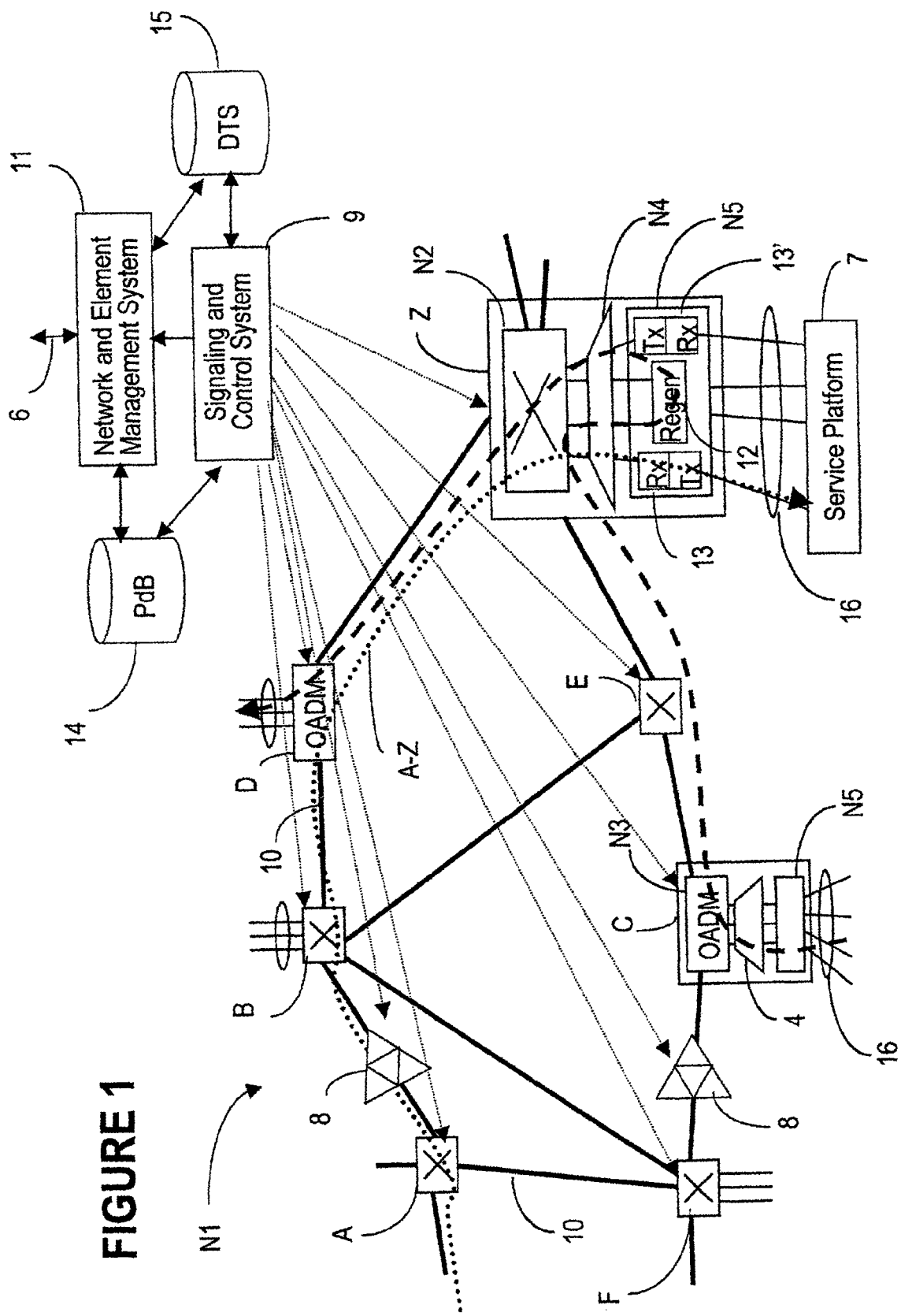
FIG. 1 shows the general architecture for a wavelength switching network to which the present invention is applicable.

An agile network as shown in the example of FIG. 1 is a network where connections are set-up and removed on request with optimal use of optical-to-electrical-to-optical (OEO) conversion. The DWDM layer of network N1 is mesh-connected with wavelength switching nodes (also called flexibility points or flexibility sites) instead of the traditional pt-pt nodes. The architecture and operation of this network is described in the above-referenced co-pending patent application Ser. No. 09/876,391, which is incorporated herein by reference.

To summarize, network N1 comprises bidirectional fiber links 10 connecting a plurality of nodes, which are nodes A, B, C, D, E, F, Z in the example of FIG. 1. These nodes may be switching nodes A, B, E, F, Z, or OADM (optical add/drop multiplexing) nodes C, D. Local traffic 16 originating and terminating on a service platform 7 (a router, an ATM switch, an EXC, etc.) accesses the network N1 at a switching node or an OADM node.

Network N1 may be partitioned into the following building blocks.

a) Electro-optics 5 performs on/off ramp of client signals onto/from the optical network and interfaces into the access multiplexing and switching systems of the network. System 5 includes a pool of transponders (TR), and a pool of wavelength converters/regenerators 12. Transponders 13, 13' are interfaces between the network and the service platform 7. Regenerators 12 provide OEO-based wavelength conversion and/or regeneration in the network core. Also, the transmitters for both the transponders and regenerators are tunable, allowing for flexibility in selecting an optimal end-to-end route and assigning wavelength(s) to that route.

b) Wavelength switches N2 and optical add/drop multiplexers N3 provide optical passthru, (with switching in case of nodes N2), optical add/drop of the local traffic from/to the electro-optics N5, and in some cases, channel regeneration.

c) Access multiplexing/demultiplexing and switching subsystem N4 routes the add and drop channels between the electro-optics sub-system N5 and the respective switch N2, or OADM N3. It distributes individual channels from the line system to the transponders/regenerators, and aggregates individual channels from the transponders/regenerators onto the line system.

d) Optical line subsystem 8 is provided on links 10 between the nodes. It comprises post, pre and line amplifiers and the associated dispersion and power management equipment necessary for ultra-long haul propagation along the line.

A signaling and control system (SCS) 9 is provided between all nodes and the optical line subsystem. SCS 9 allows topology discovery, fault monitoring, and photonic layer network management. As resources are added to, or removed from the network, system 9 updates a distributed topology system DTS 15 which provides network configuration information, location and connectivity of the network resources, etc. Measured and estimated performance data for all links and devices are also available from a performance database shown at 14. Based on this topology and performance information, a network and element management system (NEMS) 11 monitors and controls the operation of the network nodes and their connectivity, and provides network inventory data and various metrics.

A user may request a service from the network over an interface 6.

The following definitions are used throughout this specification:

A "connection" is a logical route from a source node, generically referred to as node A to a destination node, generically referred to as node Z.

A "route" or "trail" refers to a specific route for the A-Z connection. Thus, connection A-Z can be routed as shown in FIG. 1 along route ABDZ, which originates at switching node A, passes through nodes B and D in optical format, and is dropped at node Z to service platform 7. Connection A-Z can also be established along route AFCEZ.

"Dial", "Redial", "Call" or "connection request" refers to a request for a new connection between nodes A and Z. It includes conditions such as the source and destination nodes, traffic bandwidth and rate, the class of service CoS, the type of routing, explicit constraints, etc.

A "flexibility point" or a "network node" is a node such as A, B, D or Z that performs optical switching and add/drop, and also may perform signal regeneration.

A "link" refers to the fiber and equipment between two consecutive flexibility sites, such as 10 in FIG. 1.

As shown for connection C-D, network N1 has the ability to determine if a channel needs regeneration, looks for a regenerator 12 available at one or more flexibility sites along the route and allocates regenerator/s to the respective route to correctly deliver the signal to its destination. Thus, node Z on route CEZD is called a "regeneration site".

An "optical path" or "path" or "regenerator segment" refers to the fiber and the equipment between a transmitter and the next receiver. Thus, CZ and ZD are two regenerator segments on route C-E-Z-D.

The "Routing Cycles Method" according to the invention is a routing method, which identifies a set of fundamental cycles, which forms a basis for the cycle space of the network. Any other cycle can be produced in the network via linear combinations of the cycles in the basis. From these cycles, the routing cycles method provides explicit working/restoration paths. It is preferably that the set of fundamental cycles has at least one edge in common with two other cycles; this will reduce the execution time for the node disjoint case.

A "cycle" is a single node or a group of nodes connected together by edges such that the group of nodes and edges form a continuous string or ring. Also, a cycle may include a node more than once (i.e. it may or may not be node disjoint).

Figure 3A:
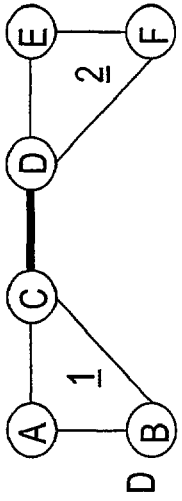
FIGS. 3a, 3b, 3c illustrate the link, node and cut edges.
Figure 3B:
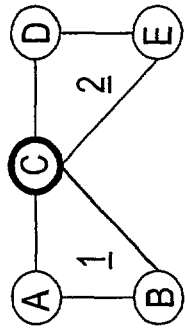
Figure 3C:
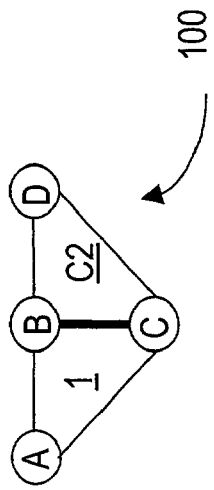

An "edge" is a node or a link connecting two cycles, as shown in FIGS. 3a-3c.

The term "class of service CoS" refers to the type of service associated with a particular call. Thus, this specification describes classes of service 0:1, 0:2 and 0:1+RR. However, the cycles method may be adapted to other CoS's.

"0:1 routing" refers to a class of service that provides one trail for a connection, with no preset protection/restoration.

"0:2 routing" refers to a class of service that provides a primary trail (P) for carrying the traffic and simultaneously a secondary trail (S) for protection/restoration. The protection function is naturally included in the routing function in this case; a connection request lights the P and S trails at the same time.

"0:1+RR routing" refers to a 0:1 class of service that provides reserved redial (RR). As for a 0:2 CoS, a primary and secondary trails are identified, but now the secondary trail is provided as a constraint to a number of requests, so that it can be shared by the respective primary trails when needed.

The term "constraint" refers to a type of routing specified in the connection request. Constrains include for example node diverse, link diverse, node diverse best effort, link diverse best effort, SRLG (shared risk link group) diverse and SRLG diverse best effort types of routing.

The term "explicit constraints" refers for example to link/node inclusions/exclusions. Other explicit constraints may be the cost limit for a route.

The term "node disjoint" or "node diverse" is used in the context of two or more routes connecting a source with a destination node, where the routes do not have any common node. In the case where node diversity cannot be satisfied for one or more nodes, the constraint is relaxed; however, the number of shared nodes between the two trails has to be kept to a minimum. This is termed "node disjoint best effort".

The term "link disjoint", or "link diverse" is used in the context of two or more routes connecting a source with a destination node, where the routes do not have any common link. In the case where link diversity is selected but cannot be satisfied for one or more links, the constraint is relaxed; however, the number of shared links between the two trails has to be kept to a minimum. This is termed "link disjoint best effort".

"SRLG (Shared Risk Link Group) diverse" refers to two link diverse sub-trails, which have links with the same SRLG, given as a SRLG ID. The routes will be considered to be SRLG diverse if the primary and the secondary routes do not links with the same SRLG ID. The link diversity constraint is applied only for that portion of the sub network. If a SRLG constraint cannot be satisfied, the SRLG diversity constraint is relaxed for the respective set of links. If link diverse paths cannot be found for a sub-network, the constraint is relaxed again to find paths with as much link diversity as possible. This is termed "SRLG best effort".

Figure 2:
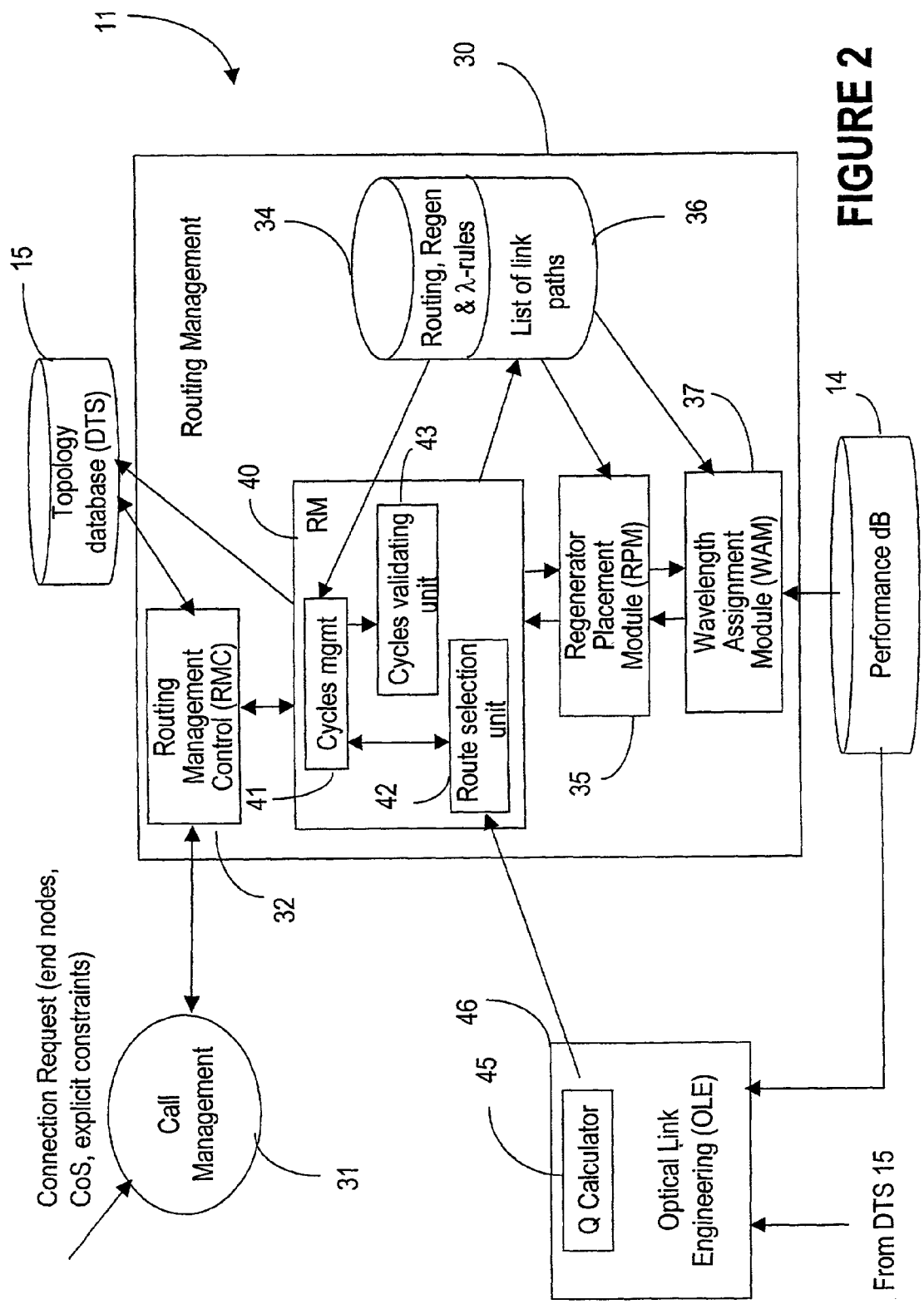
FIG. 2 shows the main modules involved in the routing and switching services within the network of FIG. 1, and their interaction.

FIG. 2 is a logical overview of the modules of NEMS (network and element management system) 11 pertinent to the invention.

A call management block 31 provides a routing management 30 with a connection request. Routing management platform 30 comprises a routing module (RM) 40, a regenerator placement module (RPM) 35 and a wavelength assignment module (WAM) 37. After receiving the call from block 31, a routing management control (RMC) 32 operates modules RM 40, RPM 35 and WAM 37 to generate a list of possible best routes, based on the current network topology, on path/route performance and on the conditions imposed by the respective connection request. The current topology is available from the distributed topology system DTS 15, while the performance information is retrieved from a performance database 39. The RMC 32 orders the routes in a list 36 according to their chances of a successful set-up and supplies the routes one by one to the call management block 31. Block 31 attempts to setup the connection, and if the first route on the list fails, block 31 tries next route, and so on. The list of routes 36 is maintained until the A-Z connection is successfully established.

Modules 40, 35 and 37 operate according to a set of rules 34. The set of rules used by the RM 40 depends on the routing method used. Methods such as Breath First Search (BFS), Ford-Fulkerson Augmenting Path (FAP), and/or the routing cycles method may be used to find the best route for the respective request. Since the present invention is concerned with the routing cycles method, FIG. 2 illustrates generically the units pertinent to this method. Thus, unit 40 comprises a cycles management unit 41, which provides one or more solution cycles in response to a connection request. A cycles validation unit 42 examines the routing rules 34 and the constraints received in the connection request from CM 31, and eliminates the solution cycles that do not conform to the constraints and the rules. A route selection unit 42 separates the validated solution cycles into routes, and eliminates the routes that do not respect the explicit constraints in the request or perform under a threshold performance parameter.

The RPM 35 is invoked by the RM 40 for placing regenerators along the selected routes, and operates based on regenerator rules from database 34, regenerator availability obtained from DTS 15 and on constraints specified in the call. The WAM 37 is invoked by the RPM 35 for assigning wavelengths to each regenerator segment, based on wavelength rules 34, wavelength availability from DTS 15 and wavelength performance information obtained from a performance database 149.

A Q calculator 45, provided by the optical link engineering (OLE) module 46, is used for validating and ordering the routes selected by RM 40 according to their performance. To this end, Q calculator 45 estimates the Q factor of each route based upon knowledge of network topology from DTS 15, and optical link parameters from performance database 14.

The Routing Cycles Method

As indicated above, the invention refers specifically to a routing cycles method, where the cycles management 40 constructs a specified number 'k' of cycles (for example 'k=4') according to the current network topology, links/paths performance, and also according to conditions specified in the connection request. The cycles are then each separated into a primary and a secondary route with the respective type of bandwidth reservation, or not, according to the class of service (CoS).

Network N1 is provided with the option to use FAP and BFS methods when they can give improvements in the computational time, but these are not the object of the invention.

FIGS. 3a, 3b, 3c and 4 illustrate some of the terms used in the ensuing description. FIG. 3a show a small network 100 comprising nodes A, B, C and D, and two fundamental cycles, a cycle 1 comprising nodes A, B, and C, also identified as cycle ABCA, and a cycle 2 or CDBC, comprising nodes C, D and B. These fundamental cycles may be combined to create new cycles. Thus, a new cycle in FIG. 3a is ABDCA. FIG. 3a also shows a "link edge" defined as a common link between two cycles. In this example, link BC is a link edge as it connects cycle 1 with cycle 2.

FIG. 3b shows a "node edge", defined as a network node connecting two cycles. In this example, node edge C connects cycle 1 (ABCA) and cycle 2 (CDBC).

FIG. 3c shows a "cut edge" CD.

Link edges such as edge BC in FIG. 3a may be used for node, link, SRLG, and best effort diversity routing. Node edges, such as node C in FIG. 3b may be used for link, SRLG, and best effort diversity routing. Cut edges, such as edge CD in FIG. 3c may be used only for best effort (BE) diversity routing.

Figure 4:
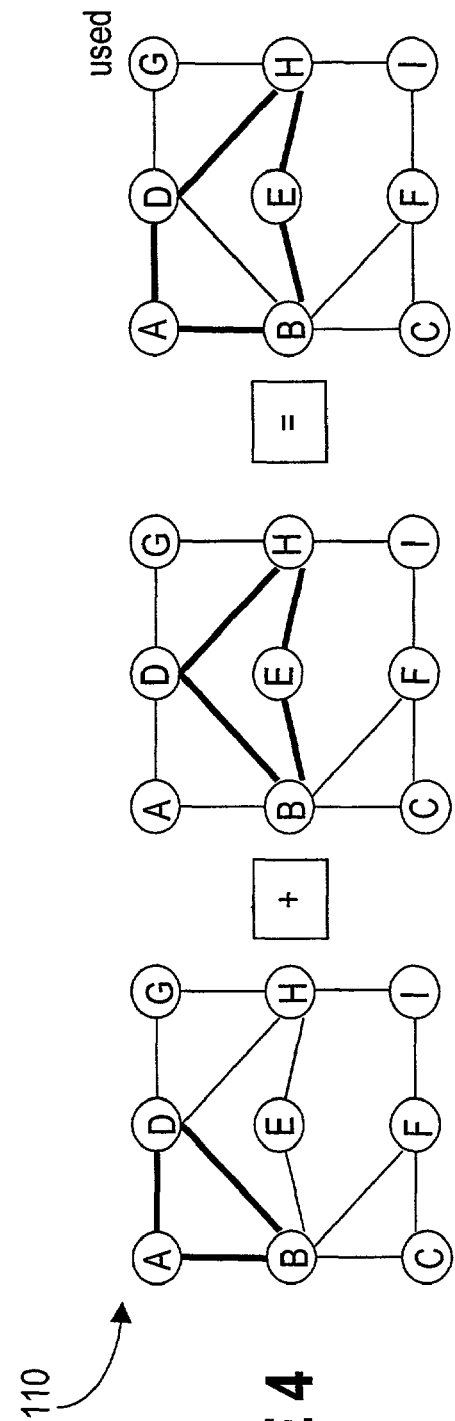
FIG. 4 illustrates how two cycles according to the invention are added.

FIG. 4 shows a small network 110 with 9 nodes A-I as an example of how cycles are added using an edge. During addition, the respective common edge (node, link, or cut) is removed. Thus, fundamental cycles BDAB and BDHEB share a link edge BD. The resulting cycle BADHEB is obtained by eliminating edge BD. It is to be noted that the addition of two large cycles may sometimes result in a smaller cycle. This type of addition is preferably used to construct cycles from the fundamental cycles.

1. 0:2 Class of Service Using Routing Cycles Method

For the 0:2 class of service, the routing management 30 finds a lowest cost (shortest) cycle, and separates it into a primary P and a secondary S route, which are lit at the same time. The protection function is naturally included in the routing function for this CoS. Constraints may be node diverse routes, node diverse best effort routes, link diverse routes, link diverse best effort routes, SRLG diverse routes, or SRLG diverse best effort routes. Explicit link and node include/exclude constraints are also applicable to this class of service. Switching from the primary to the secondary route is performed on the client side of the network.

a. Node Diversity Using Routing Cycles

The cycles method is described next for the 0:2 node diversity type of routing in connection with the flowchart of FIGS. 5a and 5b. The method operates in a similar way for all types of routings, the differences are provided under the respective title.

Figure 5B:
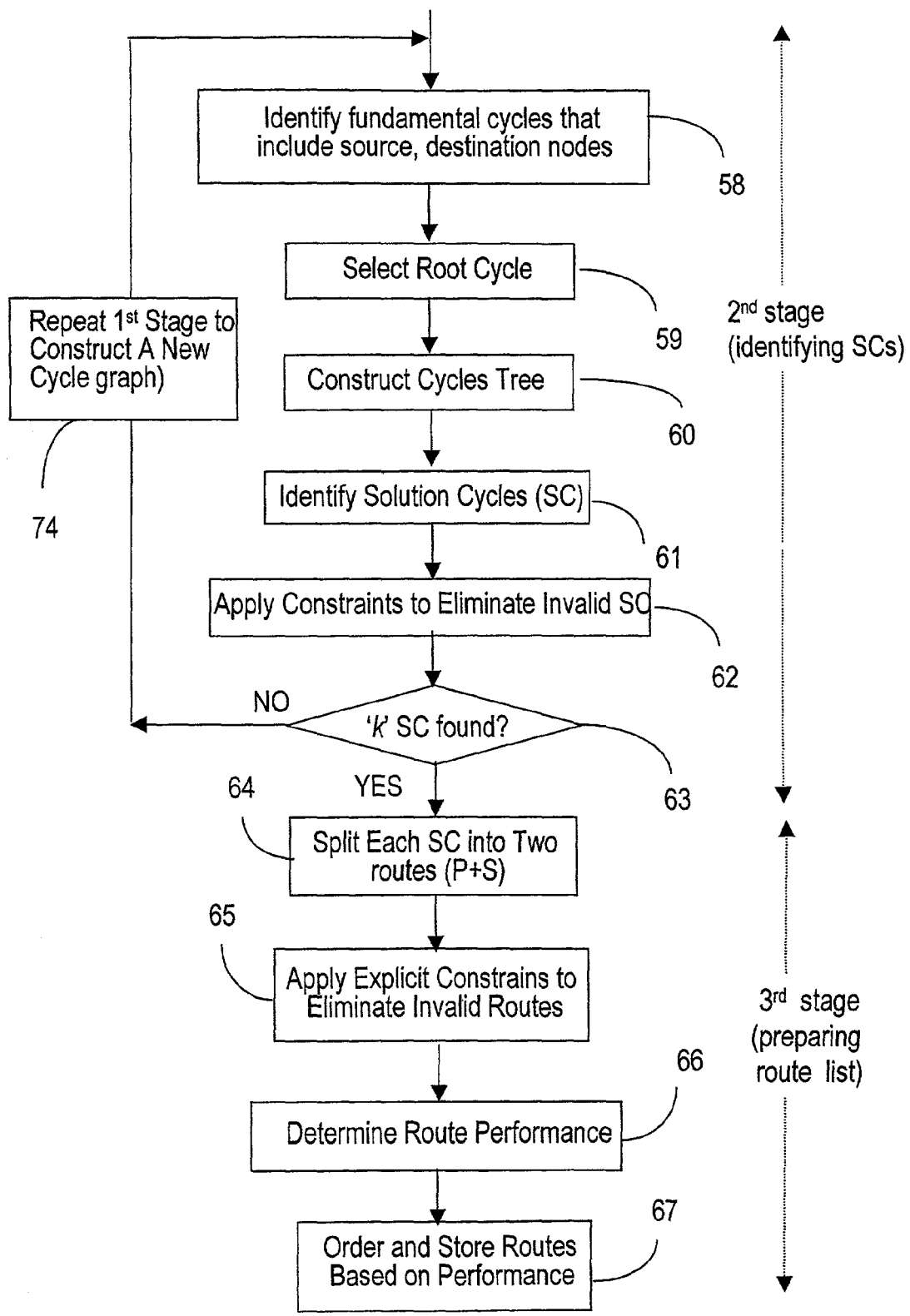

The routing cycles method is performed in three main stages, i.e. constructing cycles graph, finding a number of solution cycles on the cycles graph and preparing a list with the best routes for the solution cycle(s), as shown in the flowchart of FIGS. 5a and 5b.

Figure 6A:
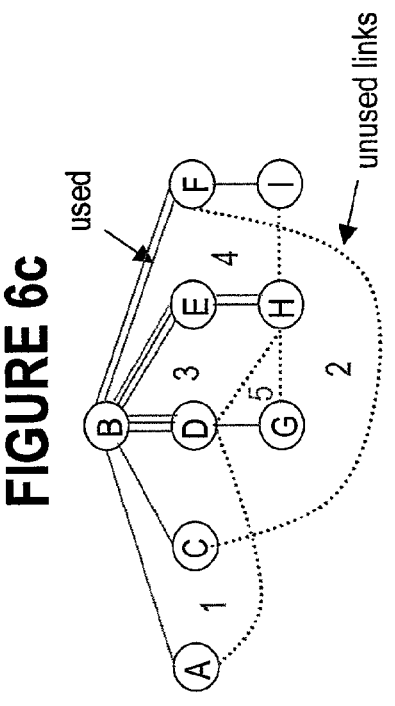
FIGS. 6a, 6b, 6c illustrate the construction of a spanning tree for finding fundamental cycles.
Figure 6B:
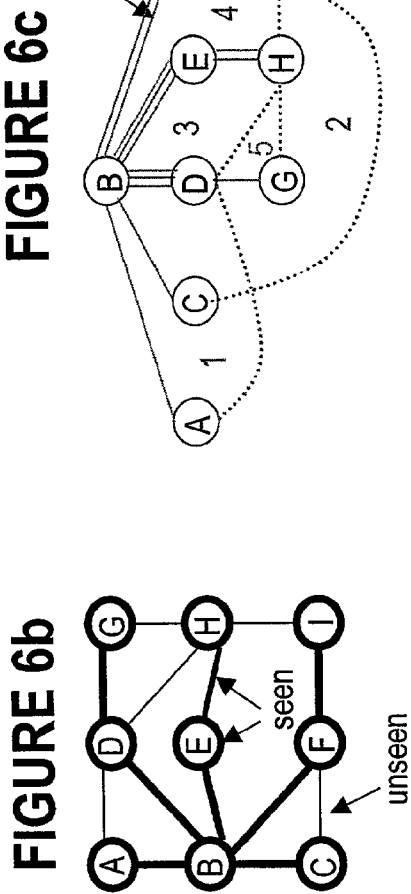
Figure 6C:
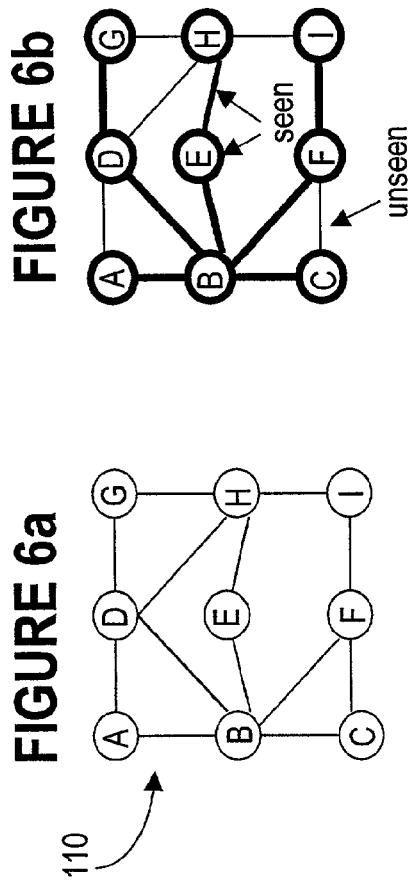

FIG. 5a shows the steps of the first stage. i.e. constructing the cycles graph. FIGS. 6a, 6b, 6c illustrate how a spanning tree (or node tree) is constructed using network 110 as an example, shown by steps 51-55 of FIG. 5a; therefore these figures are described together.

In step 50, network 110 receives a request for connecting e.g. node A with node I. In response to the request, network 110 determines the degree of each. The number of nodes directly connected to a certain node gives that node degree. In this example, node B has a degree of 5, the degree of nodes D and H is 4, etc. The node with the maximum degree is selected as the root of a spanning tree, step 51. Thus, node B is selected as the root for the spanning tree for network 110.

If there is more than one node with the same degree, the node associated with a link that is preferably nominated in the inclusion list is selected. If none of the nodes or the associated links is in the inclusion list, any node can be selected as the root. It is possible that most of the links of a potential root node are cut edges, or that the node is a node edge with no common link to other cycles. For node diversity, such a root node is rejected and another node with the same degree or a node with the next highest degree is selected.

Now, the spanning tree is built starting from node B, by 'connecting' each node with all adjacent 'unseen' nodes, step 52. The nodes and the links that have been considered, or 'seen' during this step are marked accordingly as having been seen, step 53. This is shown in thick lines in FIG. 6b. FIG. 6c shows the spanning tree in continuous lines. Thus, continuous lines are used between the root node B and nodes A, C, D, E and F adjacent to it, and from these nodes to the respective adjacent nodes G, H, I. The double, triple, etc. continuous lines between the nodes are intended to identify the cycles as discussed next.

After all nodes have been seen, as shown by the YES branch of decision block 54, the fundamental cycles are constructed in step 55 by adding to the tree all other links that have not been seen, which are in this example links AD, CF, DH, HI, GH, shown in thin lines on FIG. 6b and shown in dotted lines on FIG. 6c. A cycle comprises the root node, two branches and a respective unseen link connecting the branches. Next, the fundamental cycles are given an identification, step 55, and the cycles are stored as shown in step 56. Numerals 1 to 5 are an example of cycle identification. The fundamental cycles found for the network 110 of FIG. 6a are:

Cycle-1: BDAB
Cycle-2: BCFB
Cycle-3: BDHEB
Cycle-4: BEHIFB
Cycle-5: BDGHEB

It is to be noted that this fundamental cycles form a basis for the cycle space, and that this basis is not unique; however the size of any basis for a particular network is constant at m−(n−1), where m is the number of links and n is the number of nodes. Thus, for network 110 that has 9 nodes and 13 links, the number of fundamental cycles is 13−8=5.

Figure 7:
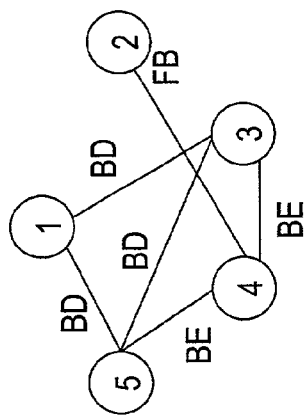
FIG. 7 is a cycles graph corresponding to the spanning tree of FIG. 6c.

The cycles are next arranged as shown at step 57 in a "cycles graph". FIG. 7 shows one way of illustrating the cycles graph for network 110. In this representation, the ID for a respective fundamental cycle is a graph node, the nodes being "connected" along link edges (links common to two cycles, as shown in FIG. 3a), which are specified accordingly on the graph.

Figure 8:
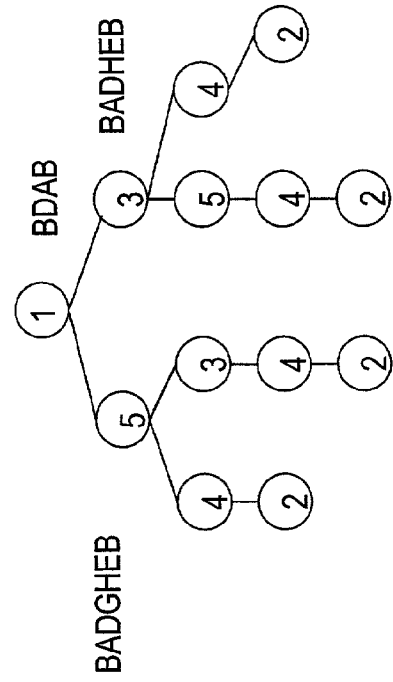

The second stage of the routing cycles method is concerned with finding solution cycles for the A-I connection request. Now, the cycles comprising the respective source and destination nodes are identified in step 58 on the flowchart of FIG. 5b. For the A-I connection request, source node A belongs to cycle 1 only, and destination node I belongs to cycle 4. At step 59, a root cycle for the cycles tree is selected. The root cycle was arbitrarily selected to be cycle 1, and the cycles tree for network 110 is shown in FIG. 8. All possible combinations of cycles starting from the root cycle 1 are identified. A cycle appears only once on a branch of the tree. In this example, the tree has two first level branches, since cycle 1 is directly connected only two cycles 5 and 3 on the cycles graph of FIG. 6, etc. Construction of the cycles tree is shown on FIG. 5b in step 60

The next step is to identify a set of possible solution cycles SC as shown in step 61. The fundamental cycles along a branch are added successively, to obtain all cycles comprising the source and destination nodes. In the example under consideration, solution cycles are the cycles containing fundamental cycles 1 and 4. This operation is repeated for each branch of the cycles graph. For node diversity, only transitions between cycles having common links are allowed. For the above example the solution cycles are:

SC1=1+5+4

SC2=1+5+3+4

SC3=1+3+4

SC4=1+3+5+4

The additions are performed using the principle shown in FIG. 4. It is to be noted that as one progresses down a branch, new cycles are created. Thus,

---

Cycle 1 + Cycle 5 ⊳ BDAB + BDGHEB = BADGHEB
At the next level of the cycles tree
SC1 = Cycle 1 + Cycle 5 + Cycle 4 ⊳ BADGHEB + BEHIFB = BADGHIFB
Cycle 1 + Cycle 5 + Cycle 3 ⊳ BADGHEB + BDHEB = BADGHDB
And further down, to obtain another solution cycle SC2:
SC2 = Cycle 1 + Cycle 5 + Cycle 3 + Cycle 4 ⊳ BADGHDB + BEHIFB = BADGHIFCB
For the branch passing through cycle 3,
Cycle 1 + Cycle 3 ⊳ BDAB + BDHEB = BADHEB
At the next level of the cycles tree:
SC3 ⊳ BADHEB + BEHIFB = BADHIFB
Cycle 1 + Cycle 3 + Cycle 5 ⊳ BADHEB + BDGHEB = BADGHEB
And further down, to obtain another solution cycle SC4:
SC4 ⊳ BADGHEB + BEHIFB = BADGHIFB

---

Additional cycles may be built in network 110 including the fundamental cycles 'below' cycle 4 with the destination node; these will also be solution cycles as they include cycles 1 and 4. For example, SC5=1+5+3+4+2; SC6=1+3+5+4+2; and SC&=1+3+4+1.

Some of the resultant solution cycles SC may be inappropriate for the requested type of routing; they may for example be link disjoint instead of being node disjoint. Thus, the SC5 (1+5+3+4+2) does contain nodes A and I, but it is a link disjoint solution. Similarly, the SC6 (1+3+5+4+2) is a link disjoint solution. Therefore, cycles built from the fundamental cycles need to be validated, as shown in step 62.

The process is repeated until 'k' solution cycles are found after the invalid solutions were eliminated, as indicated by step 63. In the current example, four (k=4) valid solution cycles were constructed. If less than "k" SC's are returned, then the search continues by choosing another root cycle and building another cycles tree. An exhaustive search is performed in order to find as many solutions as possible. If k solution cycles that meet the request are still not found, less than 'k' solutions that meet the most criteria are logged and the search is directed to best effort type of routing.

Once 'k' solutions are found, a list of possible routes is prepared in the 3$^{rd}$ stage. At step 64, each solution cycle SC is split into two trails (P and S) each trail containing both the source node A and the destination node I. For node disjoint calls, one pair of trails can be extracted from one solution cycle (SC). The following pairs of routes (P and S) are generated for network 110 from each of the solution cycles:

| | |
|---|---|
| SC1 = BADGHIFB ⊳ | ADGHI and IFBA |
| SC2 = BADGHIFCB ⊳ | ADGHI and IFCBA |
| SC3 = BADHIFB ⊳ | ADHI and IFBA |
| SC4 = BADHIFCB ⊳ | ADHI and IFCBA |

Next, in step 65, route validation is performed for checking if the route conforms with the explicit constraints imposed by the call, e.g. node inclusion/exclusion, link inclusion/exclusion, if any. If constraints are specified for both the primary (P) and secondary (S) routes, both must be checked.

Let's assume that the request specifies that the primary routes must pass through node H, and the secondary route S must not pass through nodes C and E. It can be seen that all primary routes include node H; on the other hand, the secondary route for the SC2 and SC4 passes through node C, so these solutions are excluded from the set.

As a result, two pair of routes can be validated, which are in this example the pairs generated by SC1 and SC3. These solutions are evaluated next based on a certain performance parameter, step 66. Preferably, the parameter is the cost of the cycle, so that the routes selected are the least expensive pair of routes for the respective connection request.

A link weighting cost function may be for example used for each link of the route defined as:

(Link Weight Cost)=(link length×link cost)+(estimated link equipment cost)+(α×link loading cost)+(cost of fiber)  EQ1

α is a binary threshold based on link load set to '0' or '1'; the set point where α becomes a '1' is determined by simulations and experiments. Link weighting cost is defined as the total cost of using the link. Link length is the physical length of the link. The purpose of this parameter is to bias routes to shorter routes. Link cost is the amortized cost given per unit of link length (e.g. km). Estimated equipment cost takes into account only equipment along the link i.e. line amplifiers, dispersion compensating modules, splitters, combiners, taps, etc. Generally, the cost of a wavelength depends on its performance. For example, on a 100 GHz grid, wavelengths λ1-16 and λ81-96 may cost $60K for 3,000 Km, λ17-32 and λ65-80 may cost $45K for 2,000 Km, and λ33-64, may cost $33.75K for 1,000 Km. All costs are amortized.

The cost of the end-to-end route may be then calculated using a cost function defined as below:

(Route Cost)=(ingress node cost)+(egress node cost)+ (estimated regen costs for route, taking into account fiber type)+Σ(link weight costs)  EQ2

The ingress node cost is the amortized cost associated with the ingress node i.e. the cost of the near-end transponder, which depends on the type (RZ, NRZ) and performance. The egress node cost is the amortized cost associated with the egress node, i.e. the cost of the far-end transceiver. The estimated regenerator costs for the route is an estimate of the number of regenerators required along the route by taking into account the type of fiber along the route. This cost is amortized. The link weight costs are the weights assigned to each link along the route.

Preferably, the Q of each route is also calculated. As seen in connection with FIG. 2, routing management 30 uses Q calculator 45 of the engineering tool 46 to determine the Q of the route based on measured and estimated link and route parameters. Alternatively, a wavelength exerciser (not shown) may be used to obtain more accurate route performance measurements (described in a co-pending patent application "Wavelength Exerciser", Ser. No. 10/021,709).

In step 67 the validated routes are ordered in list 36 according to the performance parameter(s) evaluated in step 66. Route ordering is preferably performed based on cost and then on Q.

For 0:2 CoS, the primary and secondary trails are selected such that the primary trail is shorter than the secondary trail. In addition, for the 0:2 CoS, the cost considered is preferably the cost of the cycle (the cost of P+S); in this way lowest cost cycles are considered first, rather than a lowest cost primary route with very long secondary route.

b. Link Diversity Routing Using Cycles

This type of routing is discussed with reference to network 120 of FIGS. 9a-9e. A cycles tree is also constructed for network 120 as explained in connection with network 110. Node B is selected as the root of the spanning tree; in this example it has the same degree as node H, the selection is arbitrary. Again, the links that have been seen are marked in thick lines, as shown in FIG. 9b. Links AD, FI & GH are unseen; as mentioned before, these links are used to complete the cycles, as shown in FIG. 9c. The fundamental cycles for network 20 are:

Cycle 1: BDAB
Cycle 2: BDGHEB
Cycle 3: HFIH
Cycle 4: C

It is to be noted that a single node, such as node C, may be considered as a cycle according to the definition of the cycles.

FIG. 9d illustrates the cycles graph for network 120, using as graph nodes the fundamental cycles 1 to 4. For link diversity, link and node edges are allowed only (see FIGS. 3a and 3b), i.e. edge BD between cycle 1 and cycle 2 and node H between cycle 2 and cycle 3. Cycle 4 is not allowed as it is connected to the root by a cut edge.

Let us assume again that the request identified nodes A and I as end nodes for the connection. Node A belongs to cycle 1 only, and node I belongs to cycle 3 only. Similar to node diversity, the construction of the cycles graph can start from either of these cycles. In this example the construction starts from cycle 1.

The cycles tree is built as before and it has only one branch, as illustrated in FIG. 9e. During addition operations for link diversity type of routing, transitions between cycles that have common edges are allowed, and transitions between cycles that share a single common node are also allowed.

It can be seen that both the source and destination nodes are included in the solution cycles provided by the tree, as node A is in cycle 1 and node I is in cycle 3. In this example, there is a node edge H between cycles 2 and 3, which effectively creates a link disjoint cycle solution:

$$SC = \text{Cycle } 1 + \text{Cycle } 2 + \text{Cycle } 3 \, \Phi \, BADB + BDGHEB + HIFH ==$$
$$BADGHEB + HIFH$$

Unlike the node disjoint routing, this solution provides more than a set of routes, depending on how routing is performed. Thus the cycle 1+2=BADGHEB gives two trails ADGH and HEBA and the cycle 3=HFIH can be split into trails HFI and IH. From this, two solutions are available for connection A-I:

| SC = BADGHEB + HIFH Ð Pair 1 | ADGHFI and ABEHI |
| SC = BADGHEB + HIFH Ð Pair 2 | ADGHI and ABEHFI |

It is evident that a spanning tree having "M" node edges such as node H offers $2^M$ potential solutions for a link diversity type of routing.

These pairs of routes are validated by applying any explicit constraints in the call. Then, the performance parameter(s) of each route is calculated and the routes are ordered according to their performance and stored as list 36.

c. Shared Risk Link Group Diversity Routing Using Cycles

This type of routing, shown in FIGS. 10a and 10b, is similar to a link diverse type of routing as both link edges and node edges are allowed in the cycles graph. In the example of FIG. 10a, edges GH and HI have a shared risk link group diversity SRLG1 and edges HF and EH have a SRLG2 constraint. The remaining edges have no defined SRLG.

Same network 120 as in the example of FIG. 9a is used in FIG. 10a, so that the spanning tree is the same as in FIG. 9c, and the network has the same fundamental cycles Cycle 1: BDAB
Cycle 2: BDGHEB
Cycle 3: HFIH
Cycle 4: C The cycles graph is as in FIG. 9d and the cycles tree looks as in FIG. 9e. For SRLG diversity and exclusions, branches in the cycles tree containing transitions between cycles sharing one common link or one common node are allowed, but a high cost is imposed for using these branches.

$$SC = \text{Cycle } 1 + \text{Cycle } 2 + \text{Cycle } 3 \, \Phi \, BADB + BDGHEB + HIFH ==$$
$$BADGHEB + HIFH$$

The solution cycle can now be split into various routes. Unlike the node disjoint solution, but as in the link disjoint example above, this single solution provides more than one pair of routes, depending upon how the trails are routed.

| SC = BADGHEB + HIFH Ð Pair 1 | ADGHFI and ABEHI |
| SC = BADGHEB + HIFH Ð Pair 2 | ADGHI and ABEHFI |

Again, the routes must be validated as shown by step 62 to ensure that the SRLG diversity exists. As indicated in the definition section, the routes will be considered to be SRLG diverse as long as the primary and the secondary routes do not share a common SRLG.

As seen in FIG. 10a, both the primary and secondary trails ADGHFI and ABEHI of Pair 1 use links with both SRLG1 and SRLG2, so this Pair 1 is not SRLG diverse. For Pair 2, route ADGHI has only links with SRLG1, and route ABEHFI has only links with SRLG2, so that the primary and secondary trails do not have common SRLG's. This solution is therefore SRLG diverse, hence Pair 2 is a valid solution in this example.

d. Node Disjoint Diversity, Best Effort (BE) Routing Using Cycles

To illustrate how the cycles method works for this case, the same network 120 as above is used, where the links GH and HI have SRLG1, links EH and HF have SRLG2, the remaining links having the SRLG0.

Since the network for this example is the same as in the above example, the spanning tree looks as in FIG. 9c, and the cycles found are as above:

Cycle 1: BDAB
Cycle 2: BDGHEB
Cycle 3: HFIH
Cycle 4: C

The cycles graph is shown in FIG. 11a. For best effort diversity, all three types of edges are permitted, namely link edges L, node edges N and cut edges C. This means that transitions between cycles having common edges are allowed and transitions between cycles sharing one common node are also allowed. Thus, cycle 4 (node C) is now included in the cycles graph being connected to both cycle 1 and cycle 2 over cut edge CB.

Let us assume that the connection request indicates that node C is the source node and node I is the destination node. In this case, node C belongs to cycle 4, and node I belongs to cycle 3; cycle 4 is arbitrarily chosen as the root.

The cycles tree is build as before; it has two branches 4-1-2-3 and 4-2-3, as shown in FIG. 11b. Both branches include cycle 3 with destination node I. For node diversity BE with inclusions, transitions between cycles having common edges are allowed, and transitions between cycles sharing one common node are also allowed, but a high cost is allocated to edges connecting two cycles through a node and not through an edge to ensure the maximum amount of node diversity is achieved. In this case two solution cycles are found, namely:

SC1=4+1+2+3

SC2=4+2+3, which gives for this example:

SC1=*C+BDAB+BDGHEB+HFIH* ⇒ *C-BADGHEB-HFIF*

SC2=*C+BDAB+HFIH* ⇒ *C-BDGHEB-HFIF*

The routes for these solution cycles are:

| | |
|---|---|
| SC1 = C-BADGHEB-HFIF ⇒ Pair 1 | CBADGHI and IFHEBC |
| SC2 = C-BDGHEB-HFIF ⇒ Pair 2 | CBDGHI and IFHEBC |

The correct operation for node diverse BE is to find node diverse primary and secondary routes, and failing this, SRLG diverse routes for the node in question that cannot be avoided in the primary and secondary routes. Failing this, P and S routes that are link diverse for the SRLG that cannot be avoided should be identified. It can be seen from the cycles tree of FIG. 11b that because of the cut edge CB, it is not possible to achieve any of these levels of diversity. In this case, the objective is to try to achieve the maximal diverse routes for the P and S routes. The routes may be ordered by maximal diversity, by cost, including costs for the cut edges, link edges, node edges and also the cycles themselves according to the cost weights above. If the decision is based on cost, visual inspection suggests SC2 is less expensive than SC1. This validates the routes of Pair 2, namely CBDGHI and IFHEBC.

While node edges provide a higher level of diversity, they are more costly than link edges. These costs are estimated through simulation and experiments.

2. 0:1 Class of Service Using Routing Cycles Method

Since the 0:1 class of service does not require specific bandwidth reservation for protection/restoration, the cycles method can be applied to find two diverse routes for each cycle. In this case, the cycles tree can be built from link, node and cut edges. When a solution cycle has been found as described previously, the primary and secondary routes have their performance parameters calculated, they are validated, and the list is culled to 'k' routes.

For this type of routing, when the parameters of the current route are under specified threshold(s), the routing management 30 looks for an alternative route in the list.

It is possible, as discussed above, that a number of 'k' routes cannot be identified. One of the reasons is that the routing cycles method specifically identifies cycles in the network, so that some valid routes may not be considered (e.g. when the cycles are added). Therefore, some modifications may be imposed to the cycles graph to get around this problem.

FIG. 12a is an example of a network 130 with a link CD, which is a cut edge. The 0:1 routing must use this cut edge in the cycles graph in order to find a route from A to F.

Same problem arises in the example network 140 shown in FIG. 12b. Now, if cycle 1 is CDBAC and cycle 2 is CDFEC, then for a request to connect node A with node F, the cycles graph looks as in FIG. 12c when cycle 1 including source node A is selected as the root. The solution cycle for this graph is:

SC=cycle1+cycle2=*CDBAC+CDEFC* ⇒ *CEFDBAC*.

This gives a pair of routes:

| | |
|---|---|
| SC = CEFDBAC ⇒ | ACEF and ABDF |

Figure 13:
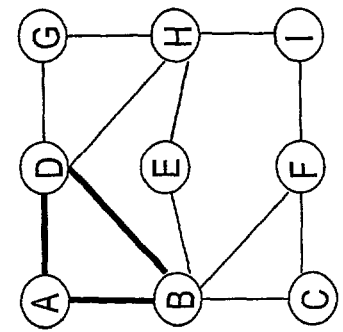
FIG. 13 illustrates a modified addition of two cycles according to the invention.
Figure 13:
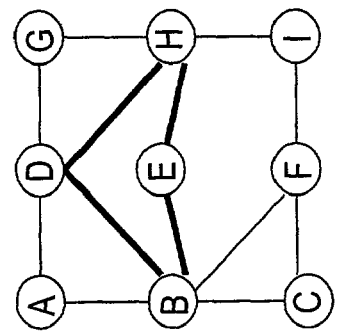
Figure 13:
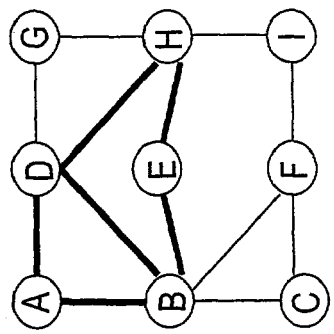

Visual inspection shows that another pair, namely routes ACDF and ABDCEF could potentially have a lower cost than the routes identified by the routing cycles method. In order to avoid this occurrence, a second type of addition operation is provided for this class of service only. This type of addition is shown in FIG. 13 for the same network 110 as in FIG. 4. Now, link edge BD that would normally be eliminated in the type of addition shown in FIG. 4, is kept in the solution, so that the result of the two cycles ABDA and DBEHD being added is no longer a cycle.

The solution in this case is ABEHDA+DB

As the cycles are built, they are tested for the constraints and only when the constraints are meet is the route search finished, as also shown in the flowchart of FIG. 5a, 5b. Also as before, the routes are sorted first based on costs, and then sorted based on Q. If the first route fails, then the routes are searched down the list until a route with a better Q is found.

3. 0:1+RR Class of Service Using Routing Cycles Method

0:1+RR class of service is similar to 0:2 class of service, except that the to secondary route is not lit, but kept in reserve, so that it can be shared by two or more primary routes. As for the 0:2 CoS, constraints may be node diverse routes, node diverse best effort routes, link diverse routes, link diverse best effort routes, SRLG diverse routes, or SRLG diverse best effort routes. Also, explicit node/link inclusions/exclusions can be specified in the request.

The difference between 0:1+RR CoS and 0:2 CoS is obtained in practice by using for the 0:1+RR CoS the same set of transceivers for the primary and secondary routes to keep the cost as low as possible.

Thus, for a 0:1+RR CoS the transmitter of a near end transceiver communicates with the receiver of a far end transceiver, and the transmitter of the far end transceiver communicates with the receiver of the near end transceiver. In an agile network architecture as shown in FIG. 1, the first and the last links need to be shared by the routes if the same set of transceivers is used for the primary and secondary routes. In the case that either of these links fails, both the primary and the secondary route will also fail.

On the other hand, for the 0:2 CoS, two different sets of transceivers are used for each route, allowing more flexibility. The main rational for using a 0:1+RR class of service is to obtain a higher degree of protection than for a 0:1 CoS for longer routes, with a lower cost than for the 0:2 CoS.

FIGS. 14a-14f show an example of how the primary and secondary routes are identified for this class of service, using the routing cycles method of the invention. The assumption for this example is that network 150 of FIG. 14a receives a request for a connection from node A to node C. In this network there are several choices for the root node, and also there is a multitude of potential routes between nodes A and C. In such cases, route selection results in large computation times.

The computation time may be reduced if any two of the nodes adjacent to the source and destination nodes, respectively, are selected as source and destination, and the routing cycles method is applied to find a solution on this simplified configuration.

Figure 14C:
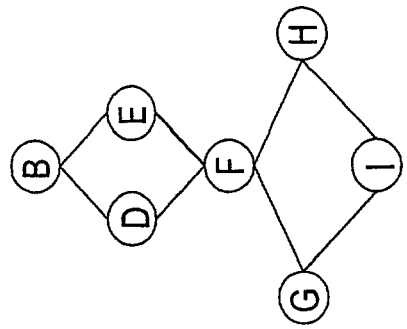
FIGS. 14a to 14f illustrate an example of applicability of the routing cycles method for a 0:1+RR class of service.
Figure 14B:
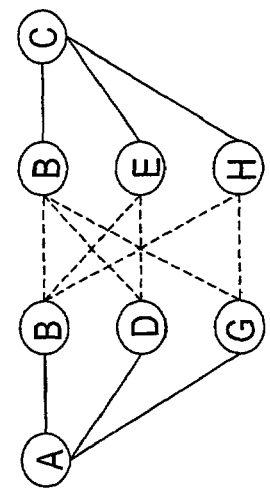
Figure 14A:
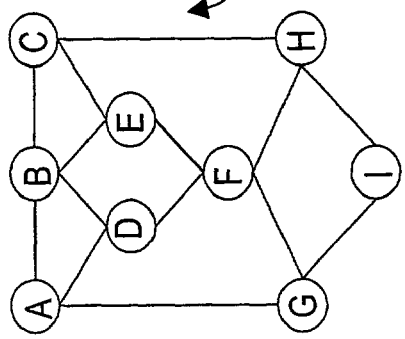

In order to select these adjacent nodes, all nodes adjacent to the source and destination, here A and C are grouped into pairs, as shown in FIG. 14b. The following adjacent node pairs are identified for network 140: B-B, B-E, B-H, D-B, D-E, D-H, G-B, G-E, G-H. For node diversity BE for example, the least cost cycles for each of these pairs is identified next. The cost is calculated by adding the cost of respective links from the source and the destination to each of the adjacent nodes, to the cost of cycle between those adjacent nodes. It is advisable to generate more than one cycle for at least some of the adjacent nodes, so as to be able to identify 'k' route sets. This is for example necessary if the total number of node pairs is less than 'k'.

It is to be noted that the cycle generated between the node pair B-B should be included as a potential cycle since the risk of losing the primary and secondary routes is lower for this cycle compared to other cycles, which may have more than one common node.

Let us assume that nodes D and E have been selected. Next, the original source and destination nodes (i.e. nodes A and C here) and the respective connecting links are removed from the original node graph. This results in a new graph shown in FIG. 14c. The routing cycles method is applied to this node graph, to generate the spanning tree shown in FIG. 14d. Two fundamental cycles are created in this example, namely:

Cycle 1=BDFEB
Cycle 2=FGIHF.

The nodes to be included in the solution cycle(s) are nodes D and E, and it can be seen that the cycle BDEFB is valid assumption. Let's assume that the request also contains an explicit constraint, namely that the routes must include nodes G and I, and that a link diverse route is satisfactory. In this example, the cycles graph built from the spanning tree of FIG. 14d may include link and node edges to build up larger cycles. For node diversity BE with exclusions/inclusions, transitions are allowed in the tree branches in which the cycles contain a common edge. Also, branches where cycles can be combined through a single node are allowed, but this adds a high cost, so that these edges are only used where necessary.

Figure 14F:
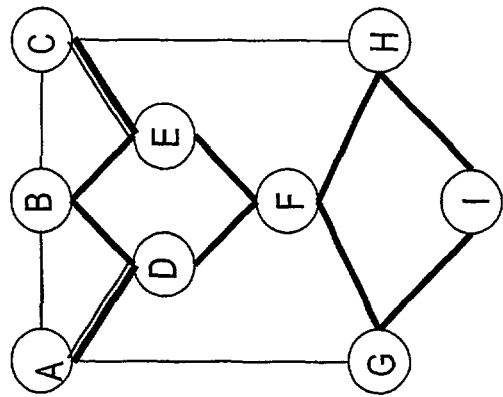
Figure 14E:
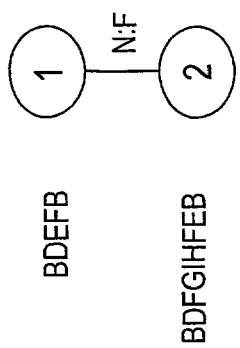
Figure 14D:
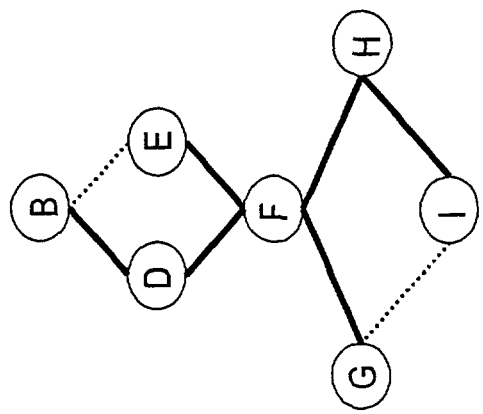

The solution from the cycles graph of FIG. 14e is $$SC=cycle1+cycle2=BDEFB+FGIHF \Rightarrow BDFGIHFEB$$

It can be seen that solution BDFGIHFEB contains all the nodes as per the constraints in the request, namely D, E, G and I and hence is a valid solution. The trails connecting nodes A and C of network 150, with the above constraints, are shown in FIG. 14f.

The cycles graph of FIG. 14e could be extended to find more solutions. When all solution have been found a new set of pair nodes may be chosen instead of nodes D and E and the process is repeated until no more node pairs exist.

As in the case of a 0:2 CoS, the primary and secondary trails are selected for the 0:1 RR CoS such that the primary route is shorter than the secondary route.

Numerous modifications, variations, and adaptations may be made to the particular embodiments of the invention without departing from the scope of the invention as defined in the claims.

We claim:

1. A method of establishing a connection between a source network node and a destination network node in response to a connection request in an automatically switched optical network, comprising:
   (a) detecting a set of fundamental cycles for said network and building a cycles graph;
   (b) constructing a cycles tree based on said fundamental cycles;
   (c) identifying on said cycles tree 'k' valid solution cycles for said connection request, wherein k is a specified integer;
   (d) preparing from said 'k' valid solution cycles a list of valid routes for said connection, including at least a first and a second route; and
   (e) setting up said connection according to a class of service CoS specified by said connection request, based on said list.

2. A method as claimed in 1, wherein step (e) comprises, for a 0:2 CoS, setting up said connection simultaneously along both said first and said second route.

3. A method as claimed in claim 1, wherein step (e) comprises, for a 0:1 CoS, setting up said connection along one of said first and second route.

4. A method as claimed in claim 1, wherein step (e) comprises, for a 0:1+RR CoS, setting up said connection along said first route and providing said second route as a constraint to all further routes constructed according to said method.

5. A method as claimed in claim 1, wherein said step (a) comprises:
   detecting a network node with a maximum degree and selecting said network node as a root network node;
   building a spanning tree starting from said root network node by sequentially connecting each network node with all adjacent unseen network nodes and marking a network node and a link as seen after it has been included into said spanning tree;
   after all network nodes have been seen, constructing said set of fundamental cycles by adding to said spanning tree all links that have not been seen; and
   building said cycle tree from said spanning tree to include all said fundamental cycles as graph nodes, any two graph nodes being connected by a respective edge.

6. A method as claimed in claim 1, wherein said step (c) comprises:
- (c1) identifying a root cycle from a first cycle on said cycles tree that includes said source network node, and a second cycle on said cycles tree that includes said destination network node;
- (c2) selecting one of said first and second cycle as said root cycle; and
- (c3) for each branch of said cycles tree, adding all cycles between said first cycle and said second cycle to obtain a solution cycle.

7. A method as claimed in claim 6, further comprising, whenever less than 'k' valid solution cycles are identified, selecting a further root cycle, constructing a further cycles tree and repeating step (c3).

8. A method as claimed in claim 6, further comprising:
examining said connection request to determine a constraint for a specified type of routing;
abandoning said solution cycle if it does not conform with said constraint.

9. A method as claimed in claim 1, wherein said step (d) comprises splitting each solution cycle into said first route and said second route.

10. A method as claimed in claim 9 further comprising validating said first and second routes by verifying conformity with an explicit constraint specified by said connection request.

11. A method as claimed in claim 1, wherein said step (d) comprises:
estimating a performance parameter of said first and second routes and abandoning said routes whenever said performance parameter is under a threshold; and
ordering all said first and second routes into said list according to their respective performance parameter.

12. A method as claimed in claim 11, wherein said performance parameter is a path weight cost.

13. A method as claimed in claim 11, wherein said performance parameter is an estimated Q, where Q indicates a factor based on link and route parameters.

14. A method of establishing a connection between a source network node and a destination network node of an automatically switched optical network, comprising:
constructing a cycles tree, based on fundamental cycles, for said network and preparing a list of 'k' valid route pairs for said connection based on said cycles tree; and
setting up said connection according to a class of service CoS specified by a respective connection request, based on said list.

15. In an automatically switched optical network, a routing module for preparing a list of valid routes for a connection request, including at least a first and a second route, comprising:
a cycle management unit for providing one or more solution cycles based on fundamental cycles; and
a cycles validating unit for validating a solution cycle that conforms with a type of routing specified in said connection request.

16. A routing module as claimed in claim 15, further comprising a route selection unit for identifying said first and said second route for each solution cycle.

17. A routing module as claimed in claim 16, wherein said route selection unit includes into said list said first and second routes if they conform with an explicit constraint received with said connection request.

18. A routing module as claimed in claim 16, wherein said route selection unit includes into said list said first and second routes if an estimated performance parameter of each said route is above a threshold.

* * * * *